(12) United States Patent
Bache et al.

(10) Patent No.: US 12,246,849 B2
(45) Date of Patent: Mar. 11, 2025

(54) AIRCRAFT EMERGENCY WAY GUIDANCE ASSEMBLIES

(71) Applicant: STG AEROSPACE LIMITED, Cwmbran (GB)

(72) Inventors: Rhian Katherine Bache, Cwnbran (GB); Sean Patrick O'Kell, Cwnbran (GB); Andrew Jon Hallett, Cwnbran (GB)

(73) Assignee: STG AEROSPACE LIMITED, Cwmbran (GB)

( * ) Notice: Subject to any disclaimer, the term of this patent is extended or adjusted under 35 U.S.C. 154(b) by 40 days.

(21) Appl. No.: 18/072,321

(22) Filed: Nov. 30, 2022

(65) Prior Publication Data

US 2023/0174249 A1 Jun. 8, 2023

(30) Foreign Application Priority Data

Dec. 3, 2021 (GB) ..................... 2117498

(51) Int. Cl.
*B64D 45/00* (2006.01)
(52) U.S. Cl.
CPC ........ *B64D 45/00* (2013.01); *B64D 2045/007* (2013.01)
(58) Field of Classification Search
CPC ........................ B64D 45/00; B64D 2045/007
See application file for complete search history.

(56) References Cited

U.S. PATENT DOCUMENTS

| 2009/0229510 A1* | 9/2009 | Sutter | G09F 13/16 |
| | | | 116/209 |
| 2020/0047665 A1 | 2/2020 | O'Kell | |

FOREIGN PATENT DOCUMENTS

| DE | 102012016046 | | 12/2013 | |
| FR | 964348 | | 8/1950 | |
| GB | 2448424 | * | 4/2008 | ............... A62B 3/00 |
| GB | 2448424 A | | 10/2008 | |
| GB | 2512498 A | | 10/2014 | |
| WO | WO2009/009483 | | 1/2009 | |

OTHER PUBLICATIONS

Search Report re Application No. GB2117498.2 dated Apr. 8, 2022; 2 pages.

* cited by examiner

*Primary Examiner* — Hongmin Fan
(74) *Attorney, Agent, or Firm* — FOLEY & LARDNER LLP

(57) ABSTRACT

An aircraft emergency guidance assembly adapted to be mounted in an aircraft cabin comprises a longitudinally extending layer of photoluminescent material and a cover over the photoluminescent material. The assembly has a height and a width and a ratio of the width to height is from 0.5:1 to 3.5:1.

20 Claims, 4 Drawing Sheets

AIRCRAFT EMERGENCY WAY GUIDANCE ASSEMBLIES

CROSS-REFERENCE TO RELATED APPLICATION

This application claims priority to and the benefit of United Kingdom Patent Application GB 2117498.2, filed Dec. 3, 2021, the entire disclosure of which is incorporated herein by reference for all purposes.

BACKGROUND

This invention is concerned with aircraft emergency way guidance assemblies and to improvements in such assemblies.

It known to provide photoluminescent floor path marking assemblies in aircraft cabins. Such assemblies are typically fitted to a floor of the aircraft cabin. In many cases an assembly in the form of a track is provided along at least one side of an aisle. In most examples a track is provided along both sides of the aisle in order to guide and direct passengers in case of an emergency from their seats to an emergency exit.

It is an object of the invention to provide an improved aircraft emergency guidance assembly.

BRIEF DESCRIPTION OF THE DRAWINGS

The invention will now be described by way of example only with reference to the following Figures in which.

DETAILED DESCRIPTION

Figure 1:
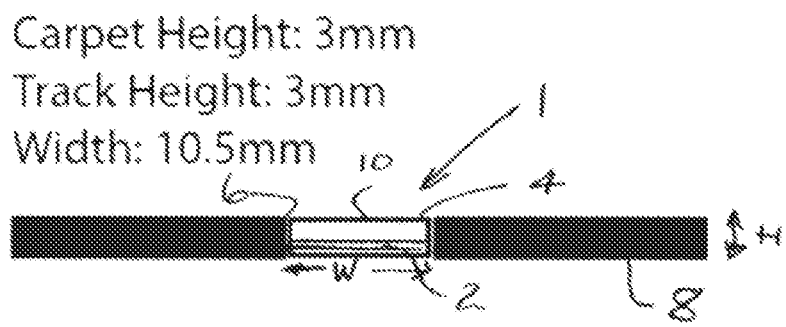
FIG. 1 is a cross section of an assembly in accordance with the invention.

According to a first aspect of the invention there is provided an aircraft emergency guidance assembly adapted to be mounted in an aircraft cabin wherein the assembly comprises a longitudinally extending layer of photoluminescent material and a housing over the photoluminescent material wherein the assembly has an envelope having a height and a width wherein the envelope has a width to height ratio of from 0.5:1 to 3.5:1.

According to a second aspect of the invention there is provided an aircraft having an aircraft cabin comprising a carpet and an aircraft emergency guidance assembly in accordance with the first aspect of the invention.

It will be appreciated that the assembly has an overall dimensional envelope comprising an overall width. The overall width is preferably a visible width of the assembly.

The width may be in the range from 2 mm to 15 mm, and optionally from 3 mm to 12 mm. For example, the width may be 10 mm, 11 mm, or 12 mm.

The dimensional envelope also comprises an overall assembly height. The overall assembly height may be a height from a base of the assembly to an upper surface of the assembly.

The height of the assembly is from 2 mm to 8 mm or more preferably from 2 mm to 6 mm. For example, the height may be 3 mm, 4 mm, or 5 mm.

In some embodiments the photoluminescent material may be encapsulated in a housing. in other embodiments the photoluminescent material may be covered by a protective housing. An upper surface of the housing may form the upper surface of the assembly.

It will be appreciated that in some embodiments the assembly may be connected to additional adjacent assemblies to form a track extending along an aisle of an aircraft cabin.

It is an object of the invention to provide an improved assembly which is robust, and durable and meets required performance characteristics. It is an advantage of the invention that invention achieves an improved use of materials and reduces the use of photoluminescent material and plastics used in a housing in achieving an assembly that meets the required performance characteristics. A further advantage is that the aesthetic appearance of the assembly is improved.

It has been found that the amount of photoluminescent material can be reduced without reducing the performance characteristics and still achieving a sufficient level of visibility to enable passengers to evacuate the cabin in an emergency. A relatively narrower track also reduces the visibility and conspicuousness of the track in ambient conditions. photoluminescent material is not currently recycled and therefore a reduction of the amount of the photoluminescent material needed improves the environmental impact of the assembly.

A reduction in the size of the housing reduces the amount of plastics used in the manufacture of the assembly and so reduces the amount of raw material, or recycled plastics material that is required in the manufacture of the assembly housing. A reduction in the amount of photoluminescent material needed to form the track may also reduce the environmental impact of the assembly.

Further it will be appreciated that reducing the height and width of the assembly reduces the weight of the installed assembly and so leads to a reduction in fuel costs. It has been found that a reduction of 40% or more of the weight of the assembly can be achieved compared to typical prior art products. In one example the weight saving from an 18 mm variant to an 11 mm variant is 42%. Weight saving compared with other assemblies will be more.

As discussed briefly above the aesthetic appearance of the track can be improved as the width of visible track in the cabin is reduced. The track is therefore less conspicuous, and it has been found that this improves a passenger's sense of security and confidence in the aircraft as the emergency measures are less obtrusive. However, it has been found that surprisingly despite the track being narrower the track performs the necessary emergency way guidance to an emergency exit in the event of an emergency.

The assembly is typically arranged to be mounted to a floor of an aircraft cabin in use. Generally, an aircraft cabin has a carpet secured to the floor of the cabin. The carpet may be arranged to have a pattern that is typical of a branding of an airline. The carpet has a thickness which may be referred to as a carpet height.

It has also believed that the assembly and track formed therefrom has an improved wear characteristic. It is believed that the smaller size of the upper surface results in a smaller chance of scratched and/or scuffs and so the upper surface is preserved for longer.

It will be appreciated that the narrower track reduces the amount of photoluminescent material that is needed for the photoluminescent layer.

Typically, the carpet height may be from 2 mm to 6 mm. In some cases, the carpet height may be from 3 mm to 4 mm.

The assembly height may be arranged to be substantially the same as the carpet height.

An assembly may comprise a support and a photoluminescent layer. The assembly may further comprise a housing. In some embodiments the assembly may comprise one or more protective layers.

In some embodiments the base may be adapted to be secured to the floor of the cabin. In some cases, the base may be secured to the floor by means of a fixing tape. The fixing tape may be provided as a part of the assembly or may be provided separately and secured to the assembly in the course of installation of the assembly.

The assembly height may be from a lower surface of the base to an upper surface of the track. The upper surface of the track may comprise an upper surface of the housing. In other embodiments the upper surface may comprises an upper surface of an outer protective layer.

The photoluminescent layer may be arranged to have a thickness or depth that is determined by safety requirements applied to aircraft emergency guidance. In other embodiments the photoluminescent layer may be arranged to have depth that is dictated by human perception of the light output from the photoluminescent layer.

In a preferred embodiment the assembly height includes any optional accessories which are used with the assembly. Accessories may be selected from the group comprising fillers, spacers, over-carpet fittings. It will be appreciated that other accessories may be combined with the assembly in fitting the assembly into an aircraft cabin and that the list above is not exhaustive.

The assembly width may be defined as being the width of the total surface area that is viewable once installed. Preferably the assembly width is the width of the total surface area that is visible in daylight once the assembly has been installed.

Preferably the assembly width includes any material that is visible between a first and a second carpet edge located on either side of the assembly when it is installed in an aircraft cabin.

It will be appreciated that visible material of the assembly may be transparent, translucent or opaque. Some or all of the assembly may be arranged to allow light to pass therethrough; i.e. it may be translucent or transparent. For example, at least a housing or cover of the assembly may be transparent or translucent. Some or all components between a photoluminescent material and an upper surface of the assembly may be transparent or translucent, at least in part.

The upper surface of the assembly may be referred to as a presentation surface. The presentation surface may include first areas through which light emitted by photoluminescent material is transmitted. The presentation surface may additionally comprise second areas through which light from photoluminescent material is not transmitted.

A height of the assembly from the base to the presentation surface may be selected based on safety factors. It will be appreciated that in the embodiments in which the assembly is adapted to be mounted to a floor in a channel in a carpet then a height of the carpet is important. It will be appreciated that carpet fibers may be able to bend. It is therefore possible that if the height of the assembly is too small then the carpet fibers can bend and overlap the presentation surface of the assembly and so may obscure the photoluminescent light emitted and required to be visible in the case of an emergency. The height of the assembly is preferably large enough that the carpet does not obscure the presentation surface of the assembly.

It will be appreciated that if the height of the assembly is too large then the assembly will project above an upper surface of the carpet and the assembly will project above the height of the carpet. It will be appreciated that a projecting assembly may be a trip hazard. It will also be appreciated that if the height of the assembly is too great and the assembly projects above the carpet then there is also an increased risk of damage from wheels of a galley cart passing over the assembly in the course of serving refreshments to passengers in the cabin.

It has also been found that if the height of the assembly is too great relative to the width then the assembly is able to flex in a longitudinal direction. The person skilled in the art is aware that undue longitudinal flexibility in an assembly can make it difficult to install the assembly in a completely straight line due to an absence of straight lines in an aircraft cabin. As the assembly becomes more flexible the quality of the installation can decrease or a good aesthetic can be difficult to achieve.

The ratio of 1:1 of the width to height ratio provides a preferred ratio in which the longitudinal flexibility is optimized. It has been found that when the ratio of the width to height is 1:1 the longitudinal flexibility is sufficiently low to allow the assembly to be installed in a straight line without undue difficulty.

Preferably the height of the assembly is from 1 mm to 10 mm. In a preferred embodiment the height of the assembly is from 2 mm to 8 mm or more preferably from 2 mm to 7 mm or from 2 mm to 6 mm. In some preferred embodiments the height of the assembly is from 3 mm to 6 mm or from 3 mm to 4 mm.

In a more preferred embodiment, the width to height ratio may be from 1:1 to 3.5:1.

For example, the width to height ratio may be 2:1. 2.25:1. 2.5:1, 2.75:1 or 3:1. Optionally, the assembly may have a width of 10 mm or 11 mm, and a width to height ratio of 2.75.

In a more preferred embodiment, the width to height ratio may be from 1:1 to 2:1. In a most preferred embodiment the width to height ratio may be approximately 1.6:1

It will be appreciated that the width to height ratio may have a ratio that is close to the Golden ratio of 1.6:1, that is φ which is accepted as an aesthetically pleasing appearance.

In another preferred embodiment, the width to height ratio may be from 1.6:1 to 3:1, or from 2:1 to 3:1.

FIG. 1 of the appended drawings illustrates a cross-section of an aircraft emergency guidance assembly 1 in accordance with an aspect of the invention adapted to be mounted in an aircraft cabin and wherein the assembly comprises a longitudinally extending layer 2 of photoluminescent material and a cover 4 over the photoluminescent material 2. The assembly 1 has a height indicated as H and the assembly has a width W. In accordance with the invention a ratio of the width to height is about 3.5:1. In this embodiment the height of the assembly is 3 mm. In this embodiment the width of the assembly is 10.5 mm. In the illustrated embodiment the assembly is installed in a channel 6 in a carpet 8. The carpet 8 has a height of 3 mm.

The width W of the assembly is a width of a total surface area that is visible once the assembly is installed. In most examples the width of the assembly is a width of an upper surface 10 of the assembly 1.

Figure 2:
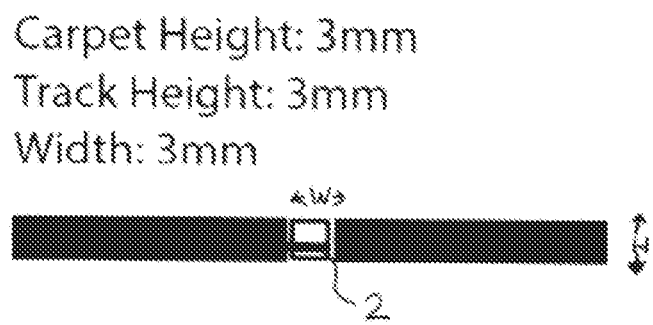
FIG. 2 is a cross section of an alternative assembly in accordance with the invention.

An alternative embodiment is illustrated in FIG. 2. In this embodiment the assembly has a height H of 3 mm and a width W of 3 mm. A carpet 8 adjacent to the track has a height of 3 mm. In this embodiment the ratio of the width to the height is 1:1.

Figure 3:
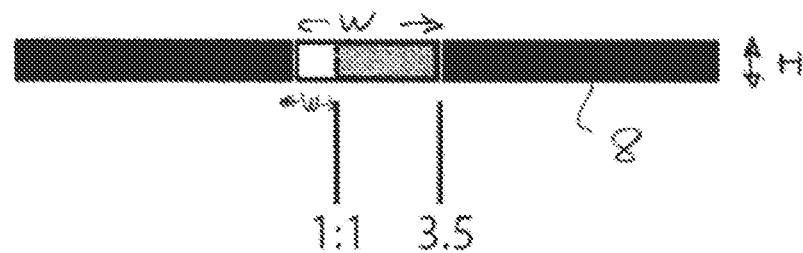
FIG. 3 is an illustrative cross section showing a range of width to height ratios falling with the scope of the invention.

FIG. 3 of the drawings illustrates a range of ratios from 1:1 to 3.5:1.

It will be appreciated that typically in an aircraft a carpet 8 installed in the aircraft typically has a height from 2 mm to 6 mm. Most carpets have a height of from 3 mm to 4 mm.

It will be appreciated that if the height H of the assembly is greater than the height of the carpet then it will be found that the assembly 1 can be a trip hazard. It is therefore desirably that the height H of the assembly 1 is therefore from 3 mm to 4 mm. It will be appreciated that in some embodiments the height H of the assembly may be from 1 mm to 8 mm.

Figure 4:
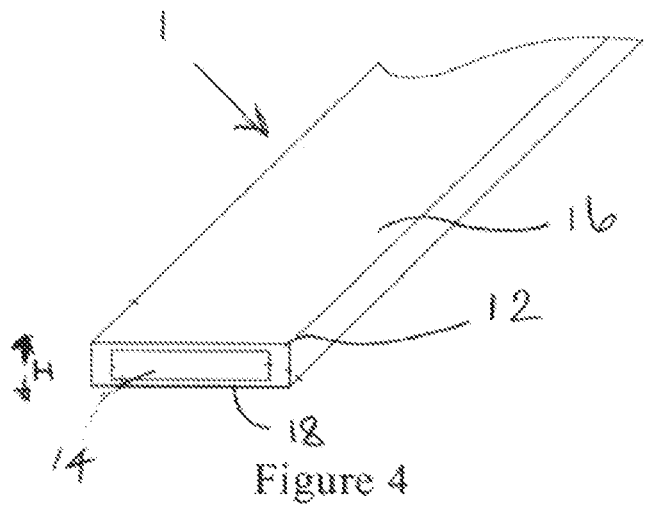
FIG. 4 is a perspective view of an assembly in accordance with the invention (not to scale)

FIG. 4 illustrates an assembly 1 in more detail and in this embodiment the assembly 1 comprises a housing 12 that encapsulates a photoluminescent layer 14.

It will be appreciated in that in other embodiments the assembly may comprise a base and a photoluminescent layer and one or more protective layers. In other embodiments the base and photoluminescent layer may comprise a cover or a housing over the base and photoluminescent layer. In some embodiments the photoluminescent layer may be provided on a support which may be arranged over the base.

In the embodiment of FIG. 4 the housing 1 has an upper surface 16 and the height H is from the base 18 to upper surface 16 of the housing.

It will be appreciated that the base 18 of the assembly 1 may be adapted to be securable to the floor of an aircraft cabin 20 in use. The base 18 of the assembly may be secured to or mounted on the floor 22 by conventional means.

The assembly 1 extends longitudinally and may be adapted to be connected to a further assembly to form a track 24 that can be fitted to a floor of an aircraft cabin and to extend along an aisle 26 of an aircraft cabin.

It will be appreciated by the person skilled in the art that the assembly further comprises accessories which are selected from the group comprising fillers, spacers, and over-carpet fittings.

The housing 12 extending over the photoluminescent material 14 is formed of a material that is scratch resistant. The photoluminescent material 14 may be at least partially transparent or translucent.

It has been found that an assembly in accordance with the invention provides an assembly which is robust and durable. Surprisingly the assembly meets the performance requirements of an emergency exit way marker in an aircraft cabin even though the width is narrower than has been used in the past.

It has been found that using a smaller and narrower assembly enables the amount of photoluminescent material that is required is reduced significantly and so reduces the environmental impact of the assembly. In addition, the assembly in accordance with the invention reduces the amount of plastic needed for the assembly. It will be appreciated that the present invention enables a smaller and lighter assembly to be used in forming emergency way guidance tracks and so to reduce an overall weight of the emergency way guidance system. Reducing the weight of the emergency weight guidance system enables a reduction in the amount of fuel needed. It will be appreciated that that this is important for conventional aircraft as reducing the weight of the aircraft reduces the fuel consumed in a flight. In addition, this is a particularly important aspect in relation to new types of aircraft such as electrical aircraft which already have a significant load in terms of the batteries used for power and in which it is important to ensure that any additional weight is reduced as much as possible.

Figure 6:
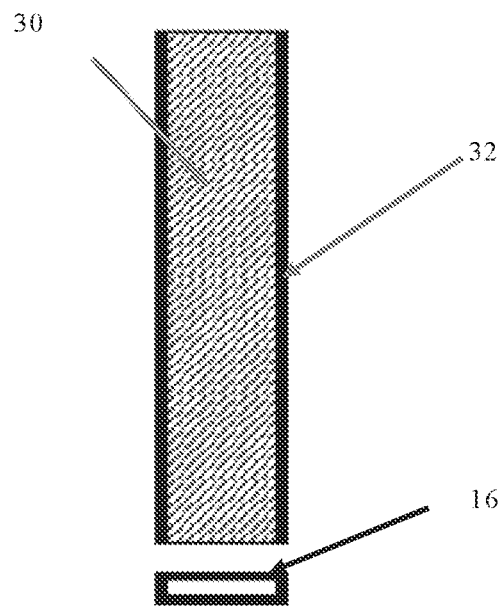
FIGS. 6A and 6B illustrate other aspects of the invention.
Figure 6B:
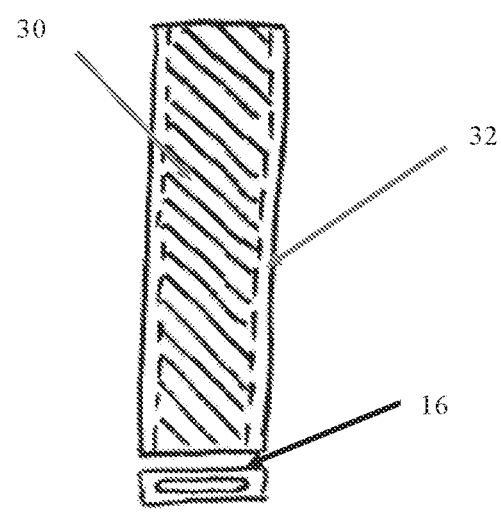

In some embodiments the upper surface of the assembly comprises at least a first area through which light emitted by photoluminescent material is transmitted and optionally comprises at least a second area through which light from photoluminescent material is not transmitted. The assembly, not shown to scale and illustrated schematically in FIGS. 6A and 6B comprises an upper surface 16 having a first area 30 through which light emitted by the photoluminescent material is transmitted and a second area 32 through which light emitted by the photoluminescent material is not transmitted.

Figure 5:
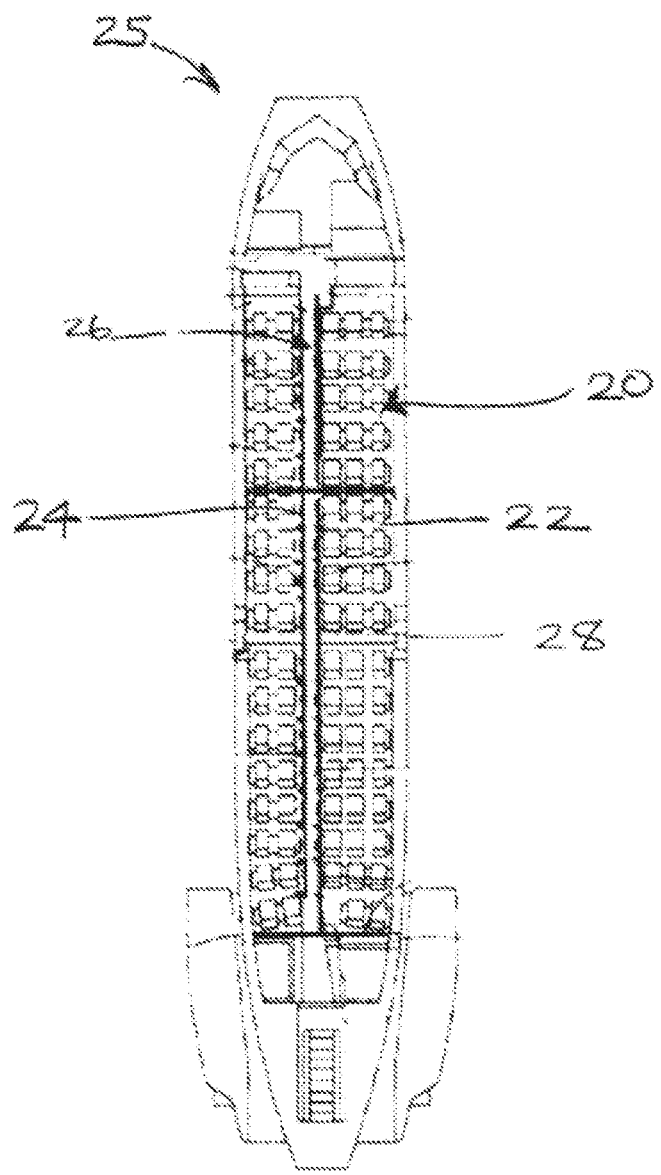
FIG. 5 is a schematic of an aircraft in accordance with another aspect of the invention.

FIG. 5 is a schematic illustration of an aircraft 25 having an aircraft cabin 20 and a number of assemblies 1 connected together to form a track 24 extending along an aisle 26 of the cabin and arranged to guide a passenger from a seat to one or more emergency exits 28.

As discussed briefly above the aesthetic appearance of the track can be improved as the width of visible track in the cabin is reduced. The track is therefore less conspicuous, and it has been found that this improves a passenger's sense of security and confidence in the aircraft as the emergency measures are less obtrusive. However, it has been found that surprisingly despite the track being narrower the track performs the necessary emergency way guidance to an emergency exit in the event of an emergency.

It has also surprisingly been found that the assembly and track formed therefrom has an improved wear characteristic. It is believed that the smaller size of the upper surface results in a smaller chance of scratched and/or scuffs and so the upper surface is preserved for longer.

It will be appreciated that the width to height ratio may have a ratio that is close to the Golden ratio of 1.6:1, that is φ, which is accepted as an aesthetically pleasing appearance.

It has been found that samples of the assembly have a pleasing proportion arising at least in part of the use of ratios close to or having the golden ratio. The assembly as a sample also has a durable and robust appearance.

It will be appreciated that as carpet fibers can bend and overlap the assembly if the height of the assembly is less than the height of the carpet. It will further be appreciated to that if the height of the assembly is greater than the height of the carpet then the assembly will potentially pose a risk of a trip hazard.

It has also been found that if the ratio of the width to height is greater than 1:1 then the assembly becomes able to flex along the length of the assembly and this may cause problems with installation of the assembly in an aircraft cabin.

What is claimed is:

1. An aircraft emergency guidance assembly adapted to be mounted in an aircraft cabin, wherein the assembly comprises a longitudinally extending layer of photoluminescent material and a cover over the photoluminescent material, wherein the assembly has a height and a width, wherein the width is the width of a total surface area that is arranged to be visible once the assembly is installed in an aircraft cabin and is in the range from 10 mm to 12 mm, and wherein a ratio of the width to height is from 2:1 to 3.5:1.

2. The aircraft emergency guidance assembly of claim 1, wherein the width to height ratio is from 2:1 to 3.5.

3. The aircraft emergency guidance assembly of claim 1, wherein the width to height ratio is 2.75:1.

4. The aircraft emergency guidance assembly of claim 1, wherein the height of the assembly is from 5 mm to 8 mm.

5. The aircraft emergency guidance assembly of claim 4, wherein the height of the assembly is 6 mm.

6. The aircraft emergency guidance assembly of claim 1, wherein the width of the assembly is 11 mm.

7. The aircraft emergency guidance assembly of claim 1, wherein the assembly comprises a support and a photoluminescent layer.

8. The aircraft emergency guidance assembly of claim 1, wherein the cover comprises at least one protective layer arranged over the photoluminescent material.

9. The aircraft emergency guidance assembly of claim 1, wherein the assembly further comprises a housing, the housing providing the cover over the photoluminescent material.

10. The aircraft emergency guidance assembly of claim 9, wherein photoluminescent material is either:
   encapsulated in a housing; or
   covered by a protective housing.

11. The aircraft emergency guidance assembly of claim 9, wherein an upper surface of the housing forms an upper surface of the assembly.

12. The aircraft emergency guidance assembly of claim 11, wherein the height of the assembly is a distance from a base of the assembly to the upper surface of the housing.

13. The aircraft emergency guidance assembly of claim 12, wherein the base is adapted in use to be secured to the floor of a cabin.

14. The aircraft emergency guidance assembly of claim 1, wherein the assembly is adapted to be connected to a further assembly to form a track adapted to be fitted to a floor of an aircraft cabin and to extend along an aisle of an aircraft cabin.

15. The aircraft emergency guidance assembly of claim 1, wherein the assembly further comprises accessories which are selected from the group consisting of fillers, spacers, and over-carpet fittings.

16. The aircraft emergency guidance assembly of claim 1, wherein the width of the total surface area that is arranged to be visible once the assembly is installed is the width of an upper surface of the assembly.

17. The aircraft emergency guidance assembly of claim 1, wherein the assembly is formed of material that allows light to be transmitted therethrough.

18. The aircraft emergency guidance assembly of claim 11, wherein the upper surface of the assembly comprises a first area through which light emitted by photoluminescent material is transmitted and at least a second area through which light from photoluminescent material is not transmitted.

19. An aircraft having an aircraft cabin comprising a carpet and an aircraft emergency guidance assembly that is adapted to be mounted in the aircraft cabin, wherein the assembly comprises a longitudinally extending layer of photoluminescent material and a cover over the photoluminescent material, wherein the assembly has a height and a width, wherein the width is the width of a total surface area that is arranged to be visible once the assembly is installed in an aircraft cabin and is in the range from 3 mm to 12 mm, and wherein a ratio of the width to height is from 2:1 to 3.5:1.

20. The aircraft of claim 19, wherein the assembly height is arranged to be substantially the same as a height of the carpet.

* * * * *